Patented Apr. 26, 1949

2,468,657

UNITED STATES PATENT OFFICE 2,468,657

TREATMENT OF DRILLING FLUIDS

Milton Dyke, San Marino, and Edward Samuel Self, Bakersfield, Calif., assignors to Oil Well Chemical and Materials Company, Inc., Los Angeles, Calif., a corporation of California No Drawing. Application April 29, 1946, Serial No. 665,898

4 Claims. (Cl. 252—8.5)

This invention relates to the treatment of drilling fluids and particularly to the treatment of water based drilling fluids, such as are employed in the rotary drilling of oil wells.

In drilling wells by the rotary method, it is necessary to circulate a drilling fluid in the bore hole to lubricate the drill bit, to carry the cuttings up to the surface, to hold down the formation pressures, and to form on the walls of the bore hole a sheaf or cake which prevents the drilling fluid from escaping into the formation.

Drilling fluids of the water base type consist of a clay suspended in water to which weighting materials, such as bentonite, galena, iron oxide, etc., are sometimes added to increase the specific gravity of the mud. The mud may be made from the natural clay which occurs at the location of the well or may be synthetically compounded from the clay and mud bases of commerce, including bentonite and beidellite.

In order to perform its function as has been above noted, the composition and condition of the drilling fluid must be rather closely controlled, and that is particularly true of its water loss to the formation and its viscosity; for if the water loss be too high, the filter cake on the wall builds up to such an extent that circulation of the mud fluid between the drill pipe and the walls of the hole is greatly impeded. Still further reasons for keeping the filter loss at the lowest possible level are to prevent caving of the walls of the bore hole and, to obtain the best possible result when cementing the casing, a thin mud cake is desirable. Still another reason for keeping water loss at a minimum is that when contacting the oil sands, the escape of water from the drilling fluid into the oil sand blocks the flow of oil into the bore hole and thereby lessens production from the producing sands.

Referring to the importance of the control of viscosity of a drilling fluid as aforementioned, if the viscosity is too low, the cuttings will not be carried to the surface properly and freezing of the drill stem may take place; if the viscosity is too high, then the cuttings will not be properly deposited in the settling ditch or slush pit of the well, and moreover the drilling fluid column is likely to be "gas-cut"; that is, become permeated with gas from the formation being drilled. For practical purposes, the viscosity is usually maintained at between about 15 and 55 centipoises, as measured on a Stormer viscosimeter.

A drilling fluid of low water loss and of proper viscosity may change appreciably as to both of these important characteristics during use. The drilling of the formation causes cuttings to enter the fluid and these cuttings may include salts or materials which increase the water loss of the drilling fluid and also increase its viscosity. The salts that seem to be particularly offensive in such regard are those of calcium and magnesium.

A still further source of contamination to the drilling fluid is that brought on by cementing a formation and a subsequent drilling operation through the cement.

One of the objects of this invention therefore is to provide a drilling fluid and a treatment for a drilling fluid for effectively lowering the water loss of said fluid.

Another object is to provide a process for treating drilling fluids in order to reduce the water loss of said fluids.

A still further object is to provide a treatment for a drilling fluid having the combined effect of reducing the water loss of said drilling fluid and the viscosity thereof.

A still further object of this invention is to provide an improved process for the treatment of drilling fluids with the chemical agents hereinafter set forth.

Still another object is to provide a drilling fluid which has improved qualities and characteristics adapting it particularly to the function of lubricating the drilling bit.

Further objects will appear from the description to follow, and it is understood that modifications thereof are included within the scope of the invention as set out in the appended claims.

One or more of the aforesaid objects may be accomplished by incorporating a small amount of a tall oil soap into a water base drilling fluid.

As an example of our invention, 40% by weight of tall oil was heated with 55% by weight of water and 5% by weight of caustic soda flakes at a temperature of 150° Fahrenheit for a period of about 30 minutes. This procedure produced a liquid soap which was then used in accordance with the process of our invention.

Six per cent (6%) by volume of a soap so produced was added to a drilling fluid which was being used in a drilling well in the Seal Beach field at Seal Beach, California. Prior to the addition of the tall oil soap, the drilling fluid had a water loss by the A. P. I. filter method of 8 cc. The addition of the tall oil soap reduced the water loss of said drilling fluid to 1.5 cc.

The extreme importance of this reduction of water loss is readily appreciated by those skilled in the art. While critical values as to the tolerances in water loss that may be permitted without causing serious trouble will vary a great deal depending upon the formations being drilled, it will be readily appreciated that cave-ins and other troubles will be less frequent with a drilling fluid of low water loss.

The viscosity of the aforesaid Seal Beach drilling fluid prior to the addition of the liquid tall oil soap of the instant invention was 50 seconds by the Marsh funnel method, using 1500 cc. of drilling fluid in and one quart out. The viscosity after the addition of the soap was 38 seconds.

Tall oil is a product of commerce which is also known as lignin liquor. It is obtained by digesting under pressure chips of wood in caustic soda, sulfite liquor or other chemicals and crystallizing or graining out the crude tall oil soap by evaporation of the waste liquor. The crude soap is then acidified to produce tall oil. Tall oil may be refined by processes such as distillation, extraction and/or decantation. Tall oil refined by such methods, or unrefined, is suitable for use in accordance with our invention. Tall oil is sold commercially as above mentioned and described in the literature.

The neutralizing agents suitable for use with the tall oil are such neutralizing agents as hydroxides of the alkali metals, for example, sodium hydroxide, potassium hydroxide, ammonium hydroxide, etc., the soluble salts of these metals with certain weak acids, organic bases and the like, or any mixture of these substances. An especially preferred reagent for our purpose is sodium hydroxide. The neutralizing agent should preferably be present in an excess of that required to neutralize the tall oil although lesser amounts are not precluded.

The product from the reaction of the tall oil and the neutralizing agent is added in amounts of from about 1% to 10% by volume of the drilling mud, a preferred range being from 2% to 6%. The quantity of our product needed will vary with the drilling mud being treated as will be appreciated by workers in the art.

In order to reduce any foaming that may occur due to the vigorous agitation of the drilling mud, it may be desirable to add a small amount of alcohol, pine oil, kerosene, and the like to the drilling mud treated in accordance with our invention.

While our invention has been described, it is intended that the description shall be taken as illustrative and that changes may be made in the products and processes within the scope of the appended claims.

We claim as our invention:

1. A water clay base drilling fluid of suitable viscosity for use in oil and gas well drilling, said fluid consisting of water, clay, and from 1% to 10% by volume based on the drilling fluid of an alkali metal tall oil soap.

2. The process of circulating a drilling fluid in a well being drilled for the production of oil or gas to form a substantially water impervious sheath on the walls of the bore hole of said well and to lubricate the bit used in the drilling of said well, which comprises preparing a clay-water drilling fluid of suitable viscosity for use in oil and gas well drilling, and mixing said fluid with from 1% to 10% by volume of an alkali metal tall oil soap, and circulating the resulting drilling fluid in a well bore hole whereby a substantially impervious sheath is formed on the walls of said bore hole.

3. A water clay base drilling fluid of suitable viscosity for use in oil and gas well drilling, said fluid consisting of water, clay, and from 1% to 10% by volume based on the drilling fluid of sodium tall oil soap.

4. The process of circulating a drilling fluid in a well being drilled for the production of oil or gas to form a substantially water impervious sheath on the walls of the bore hole of said well and to lubricate the bit used in the drilling of said well, which comprises preparing a clay-water drilling fluid of suitable viscosity for use in oil and gas well drilling, and mixing said fluid with from 1% to 10% by volume of sodium tall oil soap, and circulating the resulting drilling fluid in a well bore hole whereby a substantially impervious sheath is formed on the walls of said bore hole.

MILTON DYKE.
EDWARD SAMUEL SELF.

REFERENCES CITED

The following references are of record in the file of this patent:

UNITED STATES PATENTS

| Number | Name | Date |
| --- | --- | --- |
| 1,819,646 | Loomis et al. | Aug. 18, 1931 |
| 1,993,099 | Hodges | Mar. 5, 1935 |
| 2,209,591 | Barnes | July 30, 1940 |
| 2,350,154 | Dawson et al. | May 30, 1944 |
| 2,393,574 | Sommer | Jan. 22, 1946 |
| 2,430,039 | Anderson | Nov. 4, 1947 |
| 2,431,891 | Rosencranse | Dec. 2, 1947 |
| 2,461,483 | Self | Feb. 8, 1949 |

OTHER REFERENCES

Searle, The Chemistry and Physics of Clays and Other Ceramic Materials, 1924 edition, pages 247–249.

Lawton et al., Chemical Treatment of Rotary Drilling Muds, Articles in Physics, vol. 2, No. 5, May 1932, pages 365–375, and vol. 3, No. 4, October 1932, pages 185–192.

Passler, The problem of improving drilling muds, Chemical Abstracts, vol. 38, page 473, Jan. 20, 1944.